US007422796B2

(12) United States Patent  
Chen

(10) Patent No.: US 7,422,796 B2  
(45) Date of Patent: *Sep. 9, 2008

(54) FILM STRUCTURES HAVING IMPROVED OXYGEN TRANSMISSION

(75) Inventor: John Chu Chen, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 233 days.

This patent is subject to a terminal disclaimer.

(21) Appl. No.: 11/184,143

(22) Filed: Jul. 19, 2005

(65) Prior Publication Data

US 2007/0020466 A1 Jan. 25, 2007

(51) Int. Cl.  
*B32B 27/08* (2006.01)

(52) U.S. Cl. .................. 428/515; 428/520; 428/522; 428/523; 524/436; 524/301; 525/100; 525/106; 525/191; 525/221; 525/222; 525/240

(58) Field of Classification Search ............. 525/100, 525/191, 515, 520; 524/301, 436  
See application file for complete search history.

(56) References Cited

U.S. PATENT DOCUMENTS

| | | | |
|---|---|---|---|
| 2,897,183 | A | 7/1959 | Christl et al. |
| 3,645,992 | A | 2/1972 | Elston |
| 4,076,698 | A | 2/1978 | Anderson et al. |
| 4,685,274 | A | 8/1987 | Garwood |
| 4,840,271 | A | 6/1989 | Garwood |
| 5,025,611 | A | 6/1991 | Garwood |
| 5,028,674 | A | 7/1991 | Hatch et al. |
| 5,103,618 | A | 4/1992 | Garwood |
| 5,115,624 | A | 5/1992 | Garwood |
| 5,240,894 | A | 8/1993 | Burkhardt et al. |
| 5,264,405 | A | 11/1993 | Canich |
| 5,272,236 | A | 12/1993 | Lai et al. |
| 5,278,272 | A | 1/1994 | Lai et al. |
| 5,507,475 | A | 4/1996 | Seel et al. |
| 5,973,046 | A * | 10/1999 | Chen et al. ............. 524/300 |
| 7,045,566 | B2 | 5/2006 | Chen et al. |
| 7,238,737 | B2 | 7/2007 | Chen |
| 2003/0198715 | A1 | 10/2003 | Morris et al. |
| 2005/0020741 | A1 | 1/2005 | Chen |
| 2005/0124741 | A1 | 6/2005 | Chen |
| 2005/0256208 | A1 | 11/2005 | Chen |
| 2007/0020415 | A1* | 1/2007 | Chen ..................... 428/35.7 |
| 2007/0078223 | A1 | 4/2007 | Chen et al. |
| 2007/0207332 | A1 | 9/2007 | Chen |
| 2008/0020168 | A1 | 1/2008 | Chen |

FOREIGN PATENT DOCUMENTS

| | | | |
|---|---|---|---|
| EP | 1170332 A1 * | 1/2002 | |
| JP | 2004 169006 | 6/2004 | |
| WO | WO 2004/043155 A2 | 5/2004 | |
| WO | WO 2004/043155 A2 * | 5/2004 | |

OTHER PUBLICATIONS

International Search Report for PCT/US2006/028070 dated Jan. 17, 2007.

* cited by examiner

*Primary Examiner*—Marc S Zimmer

(57) ABSTRACT

Disclosed are films comprising highly neutralized blends of ethylene acid copolymers, organic acid salts and ethylene containing polymers (e.g. ethylene/alkyl (meth)acrylate copolymers) and/or silicon-containing polymers to provide high oxygen permeability values (OPV). Such polymeric film and polymeric film structures have improved oxygen permeability and desirable water vapor transmission, formability, and structural strength to be useful in wrapping food products requiring breathable films such as case ready meat, fish, sausage, fresh produce, and the like.

37 Claims, No Drawings

FILM STRUCTURES HAVING IMPROVED OXYGEN TRANSMISSION

BACKGROUND OF THE INVENTION

1. Field of the Invention

This invention relates to a gas permeable film suitable for use in food packaging. This invention particularly relates to improved packaging structures for perishable food products.

2. Description of the Related Art

Perishable food products are subject to contamination when exposed to microbial organisms such as bacteria, molds and the like. Contamination can result in accelerated spoilage, toxin formation and other harmful effects. Packaging such perishable goods in gas impermeable materials such as foil, coated paperboard and oxygen barrier films can provide a barrier to microbial contamination. However, anaerobic organisms such as *C. botulinum*, which produces a potent toxin that is the causative agent of botulism, thrive in oxygen-depleted atmospheres. Gas impermeable materials such as foil, paperboard and oxygen barrier films are not suitable to package goods highly susceptible to botulin toxin formation.

*C. botulinum* contamination is particularly problematic in fresh fish. Packaged fresh fish is typically frozen for this reason. To avoid problems associated with storing, shipping and merchandising fresh fish, packages suitable for protecting fresh fish can be desirable.

Various packaging processes have been developed to improve the process of storing and shipping perishable foods. Vacuum packaging is a process used to protect perishable items from deterioration wherein a vacuum is applied to a package to actively remove air to conform the packaging film to the shape of the content prior to sealing the package. Skin packaging is a known technique where goods are tightly packaged within a wrapping material and where substantially all of the atmospheric air is excluded. Vacuum skin packaging is a combination of the two packaging processes. However, conventional packaging of this type excludes oxygen and therefore does not inhibit the growth of *C. botulinum*.

It has been known to include certain gases in packaging to enhance the storage stability of the contents and increase the shelf life. Packages can be made with gas impermeable materials if oxygen is available in the headspace of the package to inhibit growth of anaerobic organisms. However, it is difficult to provide sufficient oxygen in the headspace of such a package to provide extended protection against growth of anaerobes.

The U.S. Food and Drug Administration (FDA) guidelines state that packages having an oxygen transmission rate (OTR) greater than or equal to 10,000 cc/m$^2$/24 hr meets the guidelines for being "oxygen permeable". Unless a package is considered oxygen permeable by the FDA a "Hazard Analysis of Critical Control Points" (HACCP) plan must be established. Under a HACCP plan temperature monitoring is required and time/temperature indicators (TTI's) must be provided on shipping containers. Temperature monitoring protocols alone may not be sufficient in protecting food from spoilage. A further problem is that meeting the FDA OTR guidelines is not attainable using conventional foam trays currently used to package foodstuffs such as fresh meats.

To add to the complexity of packaging perishable foods such as fish, it can be desirable to maintain the moisture level in the food. Fish can be packaged in trays with raised areas for the fish to rest on, allowing oxygen to contact the bottom of the fish. However, trays of this type allow liquid to drain from the fish. Films having high moisture permeability allow moisture to escape from the package, resulting in dehydration of the product and lower quality.

U.S. Pat. Nos. 4,685,274; 4,840,271; 5,025,611; 5,103,618 and 5,115,624 describe packages, methods, and apparatuses for packaging perishable goods. U.S. Pat. App. Pub. 2003/0198715 A1 discloses films and packages of highly neutralized blends of organic acids and ethylene acid copolymers having good oxygen permeability.

It can be desirable to prepare packages having high oxygen permeability and low moisture permeability for packaging perishable food items.

SUMMARY OF THE INVENTION

In one aspect, the present invention is a monolithic film obtained from a blend comprising:

(a) one or more aliphatic organic acids or salts thereof having fewer than 36 carbon atoms;

(b) at least one E/X/Y copolymer (ethylene acid copolymer) wherein E is derived from ethylene, X is derived from at least one $C_3$ to $C_8$ α,β-ethylenically unsaturated carboxylic acid, and Y is derived from a comonomer selected from alkyl acrylates and alkyl methacrylates, wherein the alkyl groups have from 1 to 8 carbon atoms, or ionomers of said E/X/Y copolymers, wherein X is from about 3 to about 30 weight % of said E/X/Y copolymer, and Y is from 0 to about 35 weight % of said E/X/Y copolymer, and wherein greater than 70% of all the total acid moieties from (a) plus (b) are neutralized to the corresponding metal salts; and (c) at least one additional polymer or polymer combination selected from the group consisting of: (1) ethylene-containing homopolymers and/or copolymer; (2) silicone-containing polymer.

In another aspect, the present invention is a multilayered film comprising at least one layer of film that is obtained from a blend comprising: (a) one or more aliphatic organic acids or salts thereof having fewer than 36 carbon atoms;

(b) at least one E/X/Y copolymer wherein E is derived from ethylene, X is derived from at least one $C_3$ to $C_8$ α,β-ethylenically unsaturated carboxylic acid (ethylene acid copolymer), and Y is derived from a comonomer selected from alkyl acrylates and alkyl methacrylates, wherein the alkyl groups have from 1 to 8 carbon atoms, or ionomers of said E/X/Y copolymers, wherein X is from about 3 to about 30 weight % of said E/X/Y copolymer, and Y is from 0 to about 35 weight % of said E/X/Y copolymer, and wherein greater than 70% of all the total acid moieties from (a) plus (b) are neutralized to the corresponding metal salts; and (c) at least one additional polymer or polymer combination selected from the group consisting of: (1) ethylene-containing homopolymers and/or copolymer; (2) silicone-containing polymer.

In another aspect, the present invention is a multilayered film comprising:

(i) at least one layer of film that is obtained from a blend comprising:

(a) one or more aliphatic organic acids or salts thereof having fewer than 36 carbon atoms;

(b) at least one E/X/Y copolymer wherein E is derived from ethylene, X is derived from at least one $C_3$ to $C_8$ α,β-ethylenically unsaturated carboxylic acid (ethylene acid copolymer), and Y is derived from a comonomer selected from alkyl acrylates and alkyl methacrylates, wherein the alkyl groups have from 1 to 8 carbon atoms, or ionomers of said E/X/Y copolymers, wherein X is from about 3 to about 30 weight % of said E/X/Y copolymer, and Y is from 0 to about 35 weight % of said E/X/Y copolymer, and wherein greater than 70% of all the total acid moieties from (a) plus (b) are neutralized to the corresponding metal salts; and (c) at least one additional polymer or polymer combination selected from the group consisting of: (1) ethylene-containing homopolymers and/or copolymer; (2) silicone-containing polymer; and (ii) at least a second layer obtained from a blend comprising:

(A) one or more aliphatic organic acids or salts thereof having fewer than 36 carbon atoms;

(B) at least one E/X/Y copolymer wherein E is derived from ethylene, X is derived from at least one $C_3$ to $C_8$ $\alpha,\beta$-ethylenically unsaturated carboxylic acid (ethylene acid copolymer), and Y is derived from a comonomer selected from alkyl acrylates and alkyl methacrylates, wherein the alkyl groups have from 1 to 8 carbon atoms, or ionomers of said E/X/Y copolymers, wherein X is from about 3 to about 30 weight % of said E/X/Y copolymer, and Y is from 0 to about 35 weight % of said E/X/Y copolymer, and wherein greater than 70% of all the total acid moieties from (A) plus (B) are neutralized to the corresponding metal salts.

In another aspect, the present invention is a multilayered film comprising:

(i) at least one layer of film that is obtained from a blend comprising:

(a) one or more aliphatic organic acids or salts thereof having fewer than 36 carbon atoms;

(b) at least one E/X/Y copolymer wherein E is derived from ethylene, X is derived from at least one $C_3$ to $C_8$ $\alpha,\beta$-ethylenically unsaturated carboxylic acid (ethylene acid copolymer), and Y is derived from a comonomer selected from alkyl acrylates and alkyl methacrylates, wherein the alkyl groups have from 1 to 8 carbon atoms, or ionomers of said E/X/Y copolymers, wherein X is from about 3 to about 30 weight % of said E/X/Y copolymer, and Y is from 0 to about 35 weight % of said E/X/Y copolymer, and wherein greater than 70% of all the total acid moieties from (a) plus (b) are neutralized to the corresponding metal salts; and (c) at least one additional polymer or polymer combination selected from the group consisting of: (1) ethylene-containing homopolymers and/or copolymer; (2) silicone-containing polymer and (ii) at least a second polymeric layer consisting essentially of at least one ethylene-containing copolymer or at least one silicon-containing polymer or copolymer.

In another aspect, the present invention is a package comprising a film obtained from a blend comprising:

(a) one or more aliphatic organic acids or salts thereof having fewer than 36 carbon atoms;

(b) at least one E/X/Y copolymer wherein E is derived from ethylene, X is derived from at least one $C_3$ to $C_8$ $\alpha,\beta$-ethylenically unsaturated carboxylic acid (ethylene acid copolymer), and Y is derived from a comonomer selected from alkyl acrylates and alkyl methacrylates, wherein the alkyl groups have from 1 to 8 carbon atoms, or ionomers of said E/X/Y copolymers, wherein X is from about 3 to about 30 weight % of said E/X/Y copolymer, and Y is from 0 to about 35 weight % of said E/X/Y copolymer, and wherein greater than 70% of all the total acid moieties from (a) plus (b) are neutralized to the corresponding metal salts; and (c) at least one additional polymer or polymer combination selected from the group consisting of: (1) ethylene-containing homopolymers and/or copolymer; (2) silicone-containing polymer.

The present invention provides an improvement in the OPV of previously described films obtained from ethylene acid copolymer/organic acid blends. It has been discovered that there can be a synergistic effect when an ethylene-containing copolymer (that is neither an ethylene acid copolymer nor an ionomer) is blended with a neutralized acid copolymer/organic acid blend, particularly with respect to the OPV. It has been found that inclusion of the ethylene-containing copolymer can improve OPV even though the level of E/X/Y terpolymer is reduced. That is, a blend comprising a neutralized copolymer of ethylene and an $\alpha,\beta$-ethylenically unsaturated carboxylic acid/organic acid blend with an ethylene-containing copolymer can provide OTR of greater than 10,000 $cc/m^2/24$ hr. In addition to improving the OTR of films of the present invention, the ethylene copolymer blends of the present invention provide good moisture barrier properties, and show improved processibility relative to similar blends wherein the ethylene-containing copolymer is absent.

These blended compositions provide films and or film structures having a combination of improved oxygen permeability, good formability and structural strength and can be useful in wrapping food products requiring breathable films such as case ready meat, fish, sausage, fresh produce, and the like.

DETAILED DESCRIPTION OF THE INVENTION

Unless stated otherwise, all percentages, parts, ratios, etc., are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present).

As used herein, the phrases "inside face", "inside layer", or "innermost" layer refers to the face or layer of a film or packaging web that is in contact with the packaged goods, and the phrase "outside face" or "outer layer" refers to the face of a film or packaging web not in direct contact with the packaged article and which provides the exterior surface of the package after it is formed.

Perishable goods that can be packaged according to this invention include meat, fish, poultry or fresh vegetables, as well as other perishable goods. Films as described herein provide a combination of high oxygen permeability and low moisture permeability. Such films are particularly well suited for packaging perishable food products subject to spoiling in an anaerobic atmosphere, and/or deteriorating due to dehydration, or otherwise require $O_2$ breathability to maintain freshness and the appearance of freshness.

Organic Acids and Salts

The organic acids employed in the present invention are aliphatic, mono-functional (saturated, unsaturated, or multi-unsaturated) organic acids, particularly those having fewer than 36 carbon atoms. Also salts of these organic acids may be employed. The organic acid salts are preferably magnesium or calcium salts, however other salts can be used as long as the concentration of other salts does not negate the property of oxygen permeability in a film of the present invention. Other salts can be any of the alkaline earth metals, including the barium or strontium salts, for example.

While it may be useful for the organic acids (and salts) to have a low volatility when being melt-blended with acid copolymer or ionomer, it has been discovered that volatility is not a limiting factor when neutralizing the blend to high levels, particularly near to or at 100%. As such, organic acids with lower carbon content can be used in the practice of the present invention. It can be preferred, however, that the organic acid (or salt) be non-volatile and non-migratory. By non-volatile, it is meant that they do not volatilize in the range of temperatures useful for melt blending the acid copolymer as described herein. By non-migratory, it is meant that the organic acid does not bloom to the surface of the polymer under normal storage conditions (ambient temperatures). Added acids as described herein effectively modify the ionic morphology and/or remove ethylene crystallinity from ethylene/$C_{3-8}$ α,β-ethylenically unsaturated carboxylic acid copolymers or ionomers thereof. Particularly useful organic acids include acids having from four to 34 carbons, more preferred are $C_6$ to $C_{26}$ acids, and even more preferred are $C_6$ to $C_{22}$ acids. Organic acids useful in the practice of the present invention include, but are not limited to, caproic acid, caprylic acid, capric acid, palmitic acid; lauric acid, stearic acid, isostearic acid, behenic acid, erucic acid, oleic acid, and linoleic acid and their mixtures. More preferably, the naturally derived organic fatty acids such as palmitic, stearic, oleic, behenic, and mixtures thereof can be conveniently employed. Saturated organic acids can be preferred for the purpose of reducing organoleptic properties of the films. Stearic acid can be preferred.

Saturated, branched organic acids can be particularly preferred to provide greater oxygen permeability. Of the branched saturated acids, particularly preferred is isostearic acid. One of ordinary skill can appreciate that mixtures of any of the organic acids contemplated herein can provide properties that can be expected or anticipated from the properties of the individual organic acid components.

Optional antioxidant additives can be useful in modifying the organoleptic properties (e.g. reducing odor or taste) of the blends of organic acid and ethylene copolymers used in this invention. Antioxidants may be preferred when the organic acid is unsaturated. Antioxidants are available under the trade name Irganox as from Ciba Geigy Inc. Tarrytown, N.Y. For example, phenolic antioxidants such as IRGANOX E201, CAS Number 10191-41-0) or its derivatives may be added to the blend. IRGANOX 1010 is another antioxidant suitable for use in this invention. Thus, this invention provides packages and packaged food products wherein the blends of (a), (b) and (c), as defined above, further comprise an antioxidant.

Acid Copolymers/Ionomers

Acid copolymers used in the present invention to make ionomers are preferably "direct" acid copolymers. They are preferably alpha olefin, particularly ethylene, $C_{3-8}$ α,β-ethylenically unsaturated carboxylic acid, particularly acrylic and methacrylic acid, copolymers. They may optionally contain a third monomer that can disrupt the crystallinity.

The acid copolymers can be described as E/X/Y copolymers where E is ethylene, X is the α,β-ethylenically unsaturated carboxylic acid, and Y is a comonomer. X is present in from 3 to 35 (preferably from 4 to 25, more preferably from 5 to 20) weight % of the polymer, and Y is present in from 0 to 35 weight %, preferably from 1 to 35 weight, more preferably from 4 to 25 of the polymer. Notable are E/X dipolymers, wherein Y is 0 weight % of the E/X/Y copolymer.

Suitable third comonomers are monomers selected from alkyl acrylate, and alkyl methacrylate, wherein the alkyl groups have from 1 to 8 carbon atoms. Preferred alkyl acrylate, and alkyl methacrylates are those wherein the alkyl groups have from 1 to 4 carbon atoms, and more preferred are those wherein the alkyl groups have from 3 to 4 carbon atoms.

The ethylene acid copolymers with high levels of acid (X) are difficult to prepare in continuous polymerizers because of monomer-polymer phase separation. This difficulty can be avoided by use of "co-solvent technology" as described in U.S. Pat. No. 5,028,674 or by employing somewhat higher pressures than those at which copolymers with lower acid levels can be prepared.

Specific acid copolymers include, but are not limited to: ethylene/(meth)acrylic acid dipolymers; ethylene/(meth)acrylic acid/n-butyl (meth)acrylate terpolymers; ethylene/(meth)acrylic acid/iso-butyl (meth)acrylate terpolymers; ethylene/(meth)acrylic acid/methyl (meth)acrylate terpolymers; and ethylene/(meth)acrylic acid/ethyl (meth)acrylate terpolymers.

"(Meth)acrylic acid" as used herein is shorthand notation, and shall be taken to mean "methacrylic acid and/or acrylic acid", that is, methacrylic acid alone, acrylic acid alone, or the combination of both.

Ionomers useful herein can either be "modified" or "unmodified" ionomers. Unmodified melt processable ionomers (that is, melt processable ionomers that are not blended with an organic acid component) used in this invention are obtained from acid copolymers by neutralization of same. They include partially neutralized acid copolymers, particularly ethylene/(meth)acrylic acid copolymers. The unmodified ionomers may be neutralized to any level that does not result in an intractable (that is, not melt processable) polymer without useful physical properties.

Ionomers blended with the organic acids described herein (modified ionomers) can be neutralized to any level, particularly levels higher than 70%. For the purposes of this invention, high levels of neutralization (over 70%) can be obtained by adding the stoichiometric amount of a cation source calculated to neutralize the target amount of acid moieties in the acid copolymer and organic acid(s) in the blend (hereinafter referred to as "% nominal neutralization" or "nominally neutralized"). Thus, sufficient cations are made available in the blend so that, in aggregate, the indicated level of nominal neutralization is achieved.

In any case, the ionomers useful herein consist essentially of calcium and/or magnesium-neutralized ionomers. Calcium and/or magnesium ionomeric compositions are preferred for restriction of moisture in addition to high oxygen permeability, but other cations can be present, so long as the concentration of said other cations does not rise to the level wherein the oxygen permeability of the resultant films is decreased below about 10,000 $(cc/m^2)(day)(atm)$. Other cations useful in making the highly oxygen permeable blends of this invention include lithium, sodium, potassium, or zinc, or combinations of such cations. In some instances it can be found that use of calcium can be preferred over the use of magnesium, or vice versa. One of ordinary skill in the art can determine what is preferable in a given circumstance.

Fatty Acid Modified Ionomer Blends

Components (a) and (b) of the blends described herein can be neutralized according to the following procedure:

(1) melt-blending ethylene α,β-ethylenically unsaturated $C_{3-8}$ carboxylic acid copolymer(s) and/or ionomer(s) thereof with one or more aliphatic, mono-functional, saturated or unsaturated organic acids having less than 36 carbon atoms or salts of the organic acids, and concurrently or subsequently;

(2) adding a sufficient amount of a cation source to increase the level of neutralization of all the acid moieties (including those in the acid copolymer and in the organic acid) to greater than about 70%, preferably greater than about 80%, more preferably greater than about 90%, and even more preferably from about 91% to about 100%, with the caveat that the ionomer component is melt processable when it is blended with the aliphatic organic acid in step (1). Neutralization of the organic acid can be done to any specific level within the ranges described herein, notwithstanding the specifically defined endpoints enumerated herein. One skilled in the art would know that neutralization to any level taught or claimed herein is within the teachings provided here or in the prior art.

Preferably the aliphatic, mono-functional, saturated or unsaturated organic acids having less than 36 carbon atoms or salts of the organic acids are present in a range of from about 5 to about 150 parts, alternatively, from about 25 to about 80 parts per hundred (pph) by weight of the ethylene $\alpha,\beta$-ethylenically unsaturated $C_{3-8}$ carboxylic acid copolymer(s) or ionomer(s) thereof.

Neutralization of acid copolymers and organic acids in this manner can be preferred. Neutralization of the acid copolymers can be also accomplished using a diluent as the copolymer and organic acid are neutralized. Care should be taken when neutralizing copolymers of the present invention so that there is no loss of desirable properties or difficulties in processing the copolymers. For example, an acid copolymer blended with organic acid(s) can be neutralized to over 80%, preferably 90%, more preferably to about 100% or to 100% nominal neutralization without losing melt processability as can occur with acid copolymers, not of this invention, that are neutralized to greater than 80%.

The acid copolymer(s) or unmodified, melt-processible ionomer(s) can be melt-blended with the organic acid(s) or salt(s) by any suitable manner. For example, the solid components can be mixed to obtain a non-homogeneous solid phase mixture of the components can be made and the components can then be melt-blended in an extruder.

The melt-processible, acid copolymer/organic-acid-or-salt blend can be neutralized by methods known in the art. For example, a Werner & Pfleiderer twin-screw extruder can be used to neutralize the acid copolymer and the organic acid at the same time.

Depending on the acid level of the co- or ter-polymer, the level of organic acid that controls processability can be determined from the teachings provided by the present invention. Generally speaking, and without being held to theory, the percent organic acid may need to be increased when higher acid levels are present in the backbone of the co- or ter-polymer in order to achieve similar melt indices for copolymers having relatively lower acid levels.

Ethylene-containing Polymers and Copolymers

The highly neutralized organic acids and ethylene acid copolymers (ionomers) described above are blended with at least one other polymer as component (c) which is selected from ethylene copolymers and/or homopolymers and/or silicon-containing polymers and copolymers.

Suitable ethylene containing polymers and copolymers include polyethylene homopolymers and copolymers, including branched polyethylenes such as low density polyethylenes (LDPE), linear low density polyethylenes (LLDPE), ultra low density polyethylenes (ULDPE), very low density polyethylenes (VLDPE), metallocene polyethylenes (mPE), ethylene propylene copolymers, ethylene/propylene/ diene monomer (EPDM) copolymers; and ethylene copolymers derived from copolymerization of ethylene and at least one polar comonomer selected from the group consisting of alkyl (meth)acrylate, vinyl acetate, CO, maleic acid anhydride and maleic acid derivatives.

Polyethylene (abbreviated PE) homopolymers and copolymers useful for the compositions described herein can be prepared by a variety of methods, for example but not limitation, the well-known Ziegler-Natta catalyst polymerization (see for example U.S. Pat. No. 4,076,698 and U.S. Pat. No. 3,645,992), metallocene catalyzed polymerization, Versipol catalyzed polymerization and by free radical polymerization. The polymerization can be conducted as solution phase processes, gas phase processes, and the like.

The densities of polyethylenes suitable for use in the present invention range from about 0.850 g/cc to about 0.970 g/cc, preferably from about 0.850 to about 0.930, more preferably from about 0.850 to about 0.910 g/cc. Linear polyethylenes for use herein can incorporate alpha-olefin comonomers such as butene, hexene or octene to decrease their density to within the density range so described. For example, a copolymer useful as component (c) can comprise a major portion (by weight) of a copolymer of ethylene and at least a second alpha-olefin. The second alpha olefin can be one selected from the group consisting of alpha-olefins having from 3 to about 20 carbon atoms, present in an amount of up to about 20% by weight of the copolymer. Preferred second alpha-olefins include: propylene, 1-butene, 1-hexene, 4-methyl-1-pentene, 1-octene, 1-decene, 1-tetradecene, 1-octadecene, for example. Copolymers can be obtained by polymerization of ethylene with two or more other alpha-olefins selected from propylene, 1-butene, 1-hexene, 1-octene and 4-methyl-1-pentene. Also contemplated for use herein are blends of two or more of these ethylene alpha-olefin copolymers. The copolymer can be an ethylene/propylene elastomer comprising at least one double bond.

Suitable ethylene-containing copolymers are commercially available from ExxonMobil (Exact® 3035) or DuPont Dow Elastomers (Engage® 8450), for example. Without being held to theory, metallocene polyethylene (mPE) can be of note in the practice of the present invention because of its substantially linear structure and narrow molecular weight distribution of mPE. Metallocene technology is capable of making lower density polyethylene with high flexibility and low crystallinity, with good oxygen permeability, which is a desirable property for component (c) of this invention.

The mPE employed in films of the present invention can be any such polyethylene as generally known in the art provided the oxygen permeability is sufficiently high to afford the requisite breathability necessary for the intended film and film structure applications of interest. Preferably the metallocene polyethylene has a density of less than 0.91 g/cc, wherein the normalized oxygen permeation value (OPV) at 23° C. and 50% relative humidity will be greater than about 12,400 cc-mil/m$^2$·day·atm. This mPE can optionally be blended with other low crystalline polyolefin or amorphous polyethylenes (such as low density polyethylene, LDPE; linear low density polyethylene, LLDPE; other mPE and the like) provided the film retains significantly high oxygen permeability.

Metallocene technology is described in, for example, U.S. Pat. Nos. 5,272,236; 5,278,272, 5,507,475, 5,264,405, and 5,240,894.

Ethylene copolymers having small amounts of a diolefin component such as butadiene, norbornadiene, hexadiene and isoprene are also generally suitable. Terpolymers such as ethylene/propylene/diene monomer (EPDM) are also suitable.

Copolymers of ethylene with polar comonomers can also be suitable in a blend of the present invention. Polar comonomers suitable for use in copolymers suitable herein include alkyl (meth)acrylates. The term "(meth)acrylate" is shorthand notation for "methacrylate and/or acrylate esters". The term "ethylene/alkyl (meth)acrylate copolymers" is shorthand notation for copolymers obtained from copolymerization of ethylene and alkyl (meth)acrylates. Alkyl (meth)acrylates suitable for use in the practice of the present invention are selected from alkyl (meth)acrylates comprising alkyl groups having from 1 to 8 carbon atoms.

Examples of alkyl acrylates suitable for use herein include methyl acrylate, ethyl acrylate and butyl acrylate. Ethylene/methyl acrylate (EMA) is shorthand notation for a copolymer of ethylene (E) and methyl acrylate (MA). Ethylene/ethyl acrylate (EEA) is shorthand notation for a copolymer of ethylene and ethyl acrylate (EA). Ethylene/butyl acrylate (EBA) is shorthand notation for a copolymer of ethylene and butyl acrylate (BA).

The relative amount of the alkyl (meth)acrylate comonomer incorporated into an ethylene/alkyl (meth)acrylate copolymer of the present invention can vary broadly from a few weight percent up to as high as 45 weight percent of the total copolymer or even higher. Similarly, the alkyl group can be a methyl group or any alkyl group having up to eight carbon atoms. Most preferably, the alkyl group in the alkyl (meth)acrylate comonomer is methyl, ethyl or n-butyl.

Preferably, the alkyl (meth)acrylate comonomer has a concentration range of from 5 to 45 weight percent of the ethylene/alkyl (meth)acrylate copolymer, preferably from 10 to 35 weight %, more preferably from 10 to 28 weight %.

The alkyl (meth)acrylate copolymer can be advantageously used in an amount ranging from about 5 to about 50 wt %. Preferably, the (meth)acrylate copolymer is present in an amount of from about 10 to about 35 wt %. Even more preferably, the (meth)acrylate copolymer is present in an amount of from about 15 to about 30 wt %.

In another embodiment, component (c) of the blend is an ethylene/vinyl acetate copolymer. The relative amount of the vinyl acetate comonomer incorporated into ethylene/vinyl acetate copolymers can, in principle, vary broadly from a few weight percent up to as high as 40 weight percent of the total copolymer or even higher.

The ethylene/vinyl acetate copolymer preferably has a vinyl acetate unit content of from 2 to 40% by weight, especially from 6 to 30% by weight. The ethylene/vinyl acetate copolymer preferably has a melt flow rate, measured in accordance with ASTM D-1238, of from about 0.1 to about 40 g/10 minutes, and especially from about 0.3 to about 30 g/10 minutes. The ethylene-containing copolymers useful as the third component in the blends described herein can be modified by methods well known in the art, including modification with an unsaturated carboxylic acid or its derivatives, such as maleic anhydride or maleic acid.

A mixture of two or more different ethylene/vinyl acetate copolymers can be used in the multilayer films of the present invention in place of a single copolymer as long as the average values for the comonomer content will be within the range indicated above. Particularly useful properties may be obtained when two or more properly selected ethylene/vinyl acetate copolymers are used in blends of the present invention.

Ethylene/alkyl acrylate copolymers can be prepared by processes well known in the polymer art using either autoclave or tubular reactors. The copolymerization can be run as a continuous process in an autoclave: ethylene, the alkyl acrylate, and optionally a solvent such as methanol (see U.S. Pat. No. 5,028,674) are fed continuously into a stirred autoclave of the type disclosed in U.S. Pat. No. 2,897,183, together with an initiator.

Ethylene copolymers suitable for use herein can be produced by any process, including conventional processes, such as via a tubular reactor or via an autoclave, and non-conventional processes. Ethylene/alkyl acrylate copolymers obtained from a tubular reactor are produced at high pressure and elevated temperature in a tubular reactor or the like, wherein the inherent consequences of dissimilar reaction kinetics for the respective ethylene and alkyl acrylate comonomers is alleviated or partially compensated by the intentional introduction of the monomers along the reaction flow path within the tubular reactor. Such copolymers can be obtained commercially from DuPont. Ethylene/alkyl acrylate copolymers produced via an autoclave process can be obtained commercially from Exxon/Mobil, and/or from AtoChem, for example.

The molecular weight, as measured by the melt index, of ethylene/alkyl (meth)acrylate copolymers suitable for use in the practice of the present invention can vary significantly. The specific melt index that is desirable can depend on the balance of properties sought from the organic acid/ethylene/alkyl (meth)acrylate copolymer blend intended to provide the desired mix of oxygen permeability and structural properties needed for a specific packaging film.

For the purposes of the present invention, it is contemplated that component (c) of this invention can be a mixture of components, including mixtures various species of a particular copolymer, so long as the intended use of the blend is not compromised or negated. For example, it is contemplated as within the scope of the present invention that ethylene alky (meth)acrylates having various melt indices, or having different alkyl groups, for example, can be utilized as a mixture to fulfill the intended function of component (c) herein.

Silicon-containing Polymers

Also suitable for use as a component (c) materials are silicon-containing polymers and/or copolymers (silicon-containing polymers). Silicon-containing polymers include ethylene vinyl silane copolymers; polysiloxane; and silicone rubber, for example.

Ethylene vinyl silane copolymers can be prepared in a high-pressure reactor by polymerizing ethylene with vinyl silane, or by extruder grafting of a polyethylene with vinyl silane. Reactor-produced copolymers are highly branched low-density materials. Graft copolymers can be prepared from any polyethylene homopolymer or copolymer, allowing for greater variety of properties. Ethylene vinyl silane copolymers can be obtained commercially from PolyOne. Polysiloxanes, such as polydimethylsiloxanes are suitable for use herein and can be obtained commercially from Akzo Nobel.

Silicone rubbers having methyl and vinyl groups and/or combinations of methyl, vinyl phenyl and/or fluoro substituents are suitable for use herein. Silicone rubber elastomers are available from Dow Corning.

The melt-processible, highly-neutralized acid modified ionomer blends of the present invention can be produced by (a) Melt-blending ethylene $\alpha,\beta$-ethylenically unsaturated $C_{3-8}$ carboxylic acid copolymer(s) or ionomer(s) thereof that are not neutralized to the level that they have become intractable (not melt-processible) with one or more aliphatic, mono-functional, saturated or unsaturated organic acids having less than 36 carbon atoms or salts of the organic acids, and concurrently or subsequently (b) Adding a sufficient amount of a cation source to increase the level of neutralization of all the acid moieties (including those in the acid copolymer and in the organic acid) to greater than 70%, preferably 80%, preferably 90%, more preferably near 100%, even more preferably to 100%.

(c) Adding an ethylene-containing polymer, and/or a silicon-containing polymer.

The additional polymeric material of component (c) can be melt-blended with the modified acid copolymers blends of the present invention by any manner known in the art. All of the components can be blended at the same time, sequentially, and/or in order and/or any variation that can result in a blend of the present invention. For example, the component (c) material can be blended in subsequent to the organic acid or salt modification (mixing and neutralization) of the acid copolymers or ionomers, that is, downstream in a continuous melt mixer, such as a single screw or twin screw extruder.

An organic acid modified ionomer blend of the present invention can be used to prepare monolayer or multilayer film structures.

Multilayer Films

In addition to their use in the organic acid modified ionomer blend composition of this invention, ethylene-containing polymers or ionomers can be employed as layers in multilayer films of the present invention, with the caveat that mono- or multilayer films suitable for use in the practice of the present invention should have the requisite strength needed in the projected uses of such films, in addition to high oxygen permeability as described elsewhere in this application.

The oxygen permeability of a multilayer film is related to the thickness and permeability of each of the layers in the following manner:

$$\frac{1}{OPV_{package}} = \frac{x_1}{OPV_1} + \frac{x_2}{OPV_2} + \ldots \quad (1)$$

where $OPV_{package}$ is the permeability of the package normalized to 1 ml, $OPV_1$ is the permeability of layer 1, $OPV_2$ the permeability of layer 1, $x_1$ is the fraction of the film thickness that comprises layer 1, and $x_2$ is the fraction of the film thickness that comprises layer 2.

By using formula (1), an interested practitioner can find combinations of highly permeable and less permeable materials that can achieve the desired permeability requirements of the application, while maintaining desired strength and forming properties.

For example, a two-layer film comprised of a standard ionomer and an organic acid modified ionomer blend composition of this invention (e.g. Ex. 3) will have the oxygen permeability values indicated:

$OPV_{ionomer}$=5422 cc-mil/m$^2$-day $OPV_{Ex.3}$=43,200 cc-mil/m$^2$-day.

Using formula (1), the permeability of two-layer films with different layer ratios can be determined. Example permeabilities are reported in Table B.

TABLE B

| $X_{Ionomer}$ | $X_{Ex\,3}$ | $OPV_{package}$ |
| --- | --- | --- |
| 0 | 1 | 43,200 |
| 0.2 | 0.8 | 18,049 |
| 0.4 | 0.6 | 11,407 |
| 0.6 | 0.4 | 8,339 |
| 0.8 | 0.2 | 6,571 |
| 1 | 0 | 5,422 |

A highly permeable multilayer of the present invention can be obtained by combining a skin layer of a standard ionomer with a layer of organic acid modified ionomer blend. For example, a two-layer film with an OPV of 10,000 cc-mil/m$^2$-day can be prepared with a layer of ionomer 0.475 times the total thickness of the film and a layer of organic acid modified ionomer blend 0.525 times the total thickness. A three-layer structure with the same OPV can be prepared using an inner layer of organic acid modified ionomer blend 0.525 times the total thickness and two outer layers of ionomer, each 0.2375 times the total thickness. Accordingly, highly oxygen permeable films with sufficient structural properties such as formability, stiffness, and puncture resistance for packaging case ready meat, for example, could be achieved by using multilayer films as described herein.

Consequently, blends of highly neutralized ionomers, organic acids and ethylene-containing copolymers (e.g. ethylene/alkyl (meth)acrylate copolymers), as described herein, allow much more flexibility in designing a multilayer structure with the desired high permeability properties because they have three to six times (or more) the permeability of standard ionomers. For example, films obtained from the organic acid modified ionomer blends of the present invention can have an oxygen permeability value (OPV, normalized to one mil thickness) of greater than 10,000 mil-cc/m$^2$-day, alternatively greater than 15,000 mil-cc/m$^2$-day, alternatively greater than 20,000 mil-cc/m$^2$-day, alternatively greater than 25,000 mil-cc/m$^2$-day, alternatively greater than 30,000 mil-cc/m$^2$-day, alternatively greater than 35,000 mil-cc/m$^2$-day.

Various embodiments of the present invention can be envisioned, providing at least one film layer comprising an organic acid modified ionomer blend as described herein with at least one other layer comprising other materials suitable for use herein. The various combinations are not limited by the examples provided or described herein. One of ordinary skill in the art would be able to construct suitable film structures from the teachings provided herein.

A specific embodiment of the invention provides an oxygen permeable multilayer polymeric film comprising:
(i) at least one polymeric layer consisting essentially of an organic acid modified ionomer blend composition, as defined above; and
(ii) at least one additional polymeric layer consisting essentially of a copolymer of ethylene and vinyl acetate.

Preferably this embodiment comprises three polymeric layers wherein both outer layers consist essentially of the ethylene/vinyl acetate copolymer of (ii) and a middle layer consists essentially of the organic acid modified ionomer blend of (i).

Another specific embodiment of the invention provides an oxygen permeable multilayer polymeric film comprising:
(i) at least one polymeric layer consisting essentially of an organic acid modified ionomer blend composition, as defined above; and (ii) at least one additional polymeric layer consisting essentially of a copolymer of ethylene and an alkyl (meth)acrylate.

Another specific embodiment provides an oxygen permeable multilayer polymeric film comprising
(i) at least one polymeric layer consisting essentially of an organic acid modified ionomer blend composition, as defined above; and
(ii) at least one additional polymeric layer consisting essentially of a metallocene polyethylene having a density of less than 0.91 g/cc; or a blend of a metallocene polyethylene having a density of less than 0.91 g/cc and a low density polyethylene.

Preferably this embodiment comprises three polymeric layers wherein both outer layers consist essentially of the metallocene polyethylene or metallocene polyethylene blend of (ii) and a middle layer consists essentially of the organic acid modified ionomer blend composition of (i).

Still another embodiment provides an oxygen permeable multilayer polymeric film comprising:
(i) at least one polymeric layer consisting essentially of an organic acid modified ionomer blend composition, as defined above; and
(ii) at least one polymeric layer consisting essentially of an E/X/Y copolymer wherein E is derived from ethylene, X is derived from $C_3$ to $C_8$ α,β-ethylenically unsaturated carboxylic acids, and Y is derived from a softening comonomer, or ionomers of the E/X/Y copolymers, wherein X is from about 3 to 35 weight % of the E/X/Y copolymer, and Y is from 0 to about 35 weight % of the E/X/Y copolymer and wherein from 0% to 90% of the acid is neutralized.

Preferably this embodiment comprises three polymeric layers wherein both outer layers consist essentially of the ionomer of (ii) and a middle layer consists essentially of the organic acid modified ionomer blend composition of (i).

Additional specific embodiments include films with at least three different layers, one of which consists essentially of the organic acid modified ionomer blend composition.

Accordingly, a specific embodiment of the invention provides an oxygen permeable multilayer polymeric film comprising:
(i) at least one polymeric layer consisting essentially of an organic acid modified ionomer blend composition, as defined above; and
(ii) at least one polymeric layer consisting essentially of an E/X/Y copolymer where E is derived from ethylene, X is derived from $C_3$ to $C_8$ α,β-ethylenically unsaturated carboxylic acids, and Y is derived from a comonomer, or ionomers of the E/X/Y copolymers, wherein X is from about 3 to 35 weight % of the E/X/Y copolymer, and Y is from 0 to about 35 weight % of the E/X/Y copolymer and wherein from about 0% to about 90% of the acid is neutralized; and
(iii) at least one additional polymeric layer consisting essentially of a metallocene polyethylene having a density of less than 0.91 g/cc; or a blend of a metallocene polyethylene having a density of less than 0.91 g/cc and a low density polyethylene.

Another specific embodiment of the invention provides an oxygen permeable multilayer polymeric film comprising:
(i) at least one polymeric layer consisting essentially of an organic acid modified ionomer blend composition, as defined above; and
(ii) at least one polymeric layer consisting essentially of an E/X/Y copolymer where E is derived from ethylene, X is derived from $C_3$ to $C_8$ α,β-ethylenically unsaturated carboxylic acids, and Y is derived from a softening comonomer, or ionomers of the E/X/Y copolymers, wherein X is from about 3 to 35 weight % of the E/X/Y copolymer, and Y is from 0 to about 35 weight % of the E/X/Y copolymer and wherein from about 0% to about 90% of the acid is neutralized; and
(iii) at least one additional polymeric layer consisting essentially of a copolymer of ethylene and vinyl acetate or a copolymer of ethylene and an alkyl (meth) acrylate.

In some multilayer films, it may be desirable that the organic acid modified ionomer blend composition comprise an ethylene-containing polymer that is the same as that used in the at least one additional layer.

Depending on the thickness and compositions of the individual layers of the multilayer film, such films will have oxygen transmission rates (OTRs) greater than 8,000 cc/m²-day, alternatively greater than 10,000 cc/m²-day, alternatively greater than 15,000 cc/m²-day, alternatively greater than 20,000 cc/m²-day, alternatively greater than 25,000 cc/m²-day, alternatively greater than 30,000 cc/m²-day or alternatively greater than 35,000 cc/m²-day.

The following examples are presented to more fully demonstrate and further illustrate various aspects and features of the present invention. As such, the showings are intended to further illustrate the differences and advantages of the present invention but are not meant to be unduly limiting.

EXAMPLES

In order to illustrate the enhanced oxygen transmission rates associated with a film layer involving a highly neutralized blend of ionomer, organic acid and ethylene/alkyl (meth) acrylate copolymers, cast films were prepared from the materials listed below. The oxygen permeation value (OPV) was measured for each cast film using a Mocon Ox-tram® 2/21 at 23° C. and 50% relative humidity. The resulting data expressed as a normalized oxygen permeation rate at one mil thickness (mil-cc/m²/24 hour) are presented in Table 1 below. The results show that a film of a highly neutralized blend of ionomer, organic acid and ethylene/alkyl (meth)acrylate copolymers has as much as six times the oxygen permeability value of a film comprising a standard ionomer.

Materials used

Ionomer-1: An E/15% MAA dipolymer partially neutralized with Mg, having an MI of 0.75.
Ionomer-2: An E/23.5% nBA/9% MM terpolymer partially neutralized with Mg, having an Ml of 0.95.
Ionomer-3: An E/10% MM dipolymer partially neutralized with Na, having an MI of 1.3.
EMA-1: An E/24% MA dipolymer, having an MI of 2.
EMA-2: An E/24% MA dipolymer, having an MI of 20.
EBA-1: An E/27% nBA dipolymer, having an MI of 4.
EMAA-1: An E/15% methacrylic acid dipolymer, having an MI of 60.
NA-1: a neutralizing agent comprising 50 weight % of $Mg(OH)_2$ blended in a polymer carrier comprised of an E/5% MM dipolymer with MI of 500.
NA-2: a neutralizing agent comprising 50 weight % $Mg(OH)_2$ blended in a polymer carrier of E/nBA/M terpolymer.
EVA-1: An E/28% vinyl acetate dipolymer, having an MI of 2.
EBAAA-1: An E/12.5 nBA/10.5 M terpolymer, having MI of 60
EBAMAA-1: An E/23.5% nBA/9% MM terpolymer, having MI of 200.

TABLE 1

| Ex. | Resin 1 (weight %) | Resin 2 (weight %) | Resin 3 (weight %) | Organic Acid Salt (weight %) | Neutralizing Agent (weight %) | OPV |
|---|---|---|---|---|---|---|
| 1 | Ionomer-1 (51.1) | EMA-2 (13.02) | EMAA-1 (11.84) | Mg Stearate (22.04) | NA-1 (2.0) | 20541 |
| 2 | Ionomer-1 (52.36) | EMA-2 (13.2) | EMAA-1 (10) | Mg Stearate (22.45) | NA-1 (1.99) | 35600 |
| 3 | Ionomer-1 (54.5) | EMA-2 (4.87) | EMA-1 (14.6) | Mg Stearate (23.36) | NA-1 (2.68) | 43200 |
| 4 | Ionomer-2 (49) | EBA-1 (30) | none | Mg Stearate (21) | none | 24390 |
| 5 | Ionomer-2 (56) | EBA-1 (20) | none | Mg Stearate (24) | none | 23850 |
| 6 | Ionomer-2 (63) | EBA-1 (10) | none | Mg Stearate (27) | none | 21000 |
| 7 | EBAMAA-1 (47.35) | EBA-1 (29) | none | Mg Stearate (20.3) | NA-2 (3.35) | 29460 |
| 8 | EBAMAA-1 (53.89) | EBA-1 (19.2) | none | Mg Stearate (23.1) | NA-2 (3.81) | 28630 |
| 9 | EBAMAA-1 (60.34) | EBA-1 (9.55) | none | Mg Stearate (25.85) | NA-2 (4.26) | 29795 |
| 10 | EBAMAA-1 (57.8) | EBA-1 (28.9) | none | Mg Stearate (13.5) | NA-2 (3.8) | 30860 |
| 11 | EBAMAA-1 (61.27) | EBA-1 (19.1) | none | Mg Stearate (15.3) | NA-2 (4.33) | 30420 |
| 12 | EBAMAA-1 (68.56) | EBA-1 (9.5) | none | Mg Stearate (17.1) | NA-2 (4.84) | 32620 |
| 13 | Ionomer-1 (58.18) | EMA-2 (14.67) | none | Mg Stearate (24.94) | NA-1 (2.21) | — |
| 14 | Ionomer-1 (55.27) | EMA-2 (13.94) | EMAA-1 (5) | Mg Stearate (23.69) | NA-1 (2.1) | 38606 |
| C1 | Ionomer-3 (100) | none | none | none | none | 7070 |
| C2 | Ionomer-2 (80) | none | none | Mg Stearate (20) | none | 19,090 |
| C3 | Ionomer-2 (70) | none | none | Mg Stearate (35) | none | 20,990 |
| C4 | Ionomer-2 (90) | none | none | Mg Stearate (10) | none | 19,360 |

Example 15

A coextruded two-layer film was prepared on a Brampton blown film line comprising one layer of EVA-1, nominally 1 mil thick, and one layer, nominally 2 mil thick, comprising a blend of 95 weight % of the resin of Example 13 and 5 weight % of EMAA-1. The operating parameters are listed below.

|  | Extruder X Temperature (° C.) | Extruder Y Temperature (° C.) | Extruder Z Temperature (° C.) | Die Temperature (° C.) |
|---|---|---|---|---|
| Zone 1 | 175 | 175 | 175 | 215 |
| Zone 2 | 190 | 200 | 200 | 215 |
| Zone 3 | 205 | 215 | 215 | 215 |
| Zone 4 | 215 | 215 | 215 | 215 |
| Zone 5 | 215 | — | — |  |
| Resin | EVA-1 | Ex. 13 + EMAA-1 | Ex. 13 + EMAA-1 |  |
| Gauge set (mil) | 0.97 | 0.94 | 0.94 | 3.0 ± .25 |

Line Speed: 15 feet per minute
Blow up ratio: 3 to 1
Layflat Dimension: 8 inches The resulting film had a final structure of 1.0 mil of EVA-1 and 2.25 mil of Ex. 13+EMAA-1. It had excellent formability, good sealability (using the EVA-1 layer as the sealant layer) and an OTR of 6318 cc/m² day atm.

Example 16

A coextruded two-layer film comprising a 1.6 mil thick layer of Example 3 and a 0.4 mil thick layer of Comparative Example 1 is prepared on a blown film line. The OTR is calculated to be 10,680 cc/m² day atm.

Example 17

Packages comprising two webs of the film of Example 15 and fresh salmon or flounder pieces were prepared. Pieces of fish were placed on one web of the film and a second web was placed over the fish and overlying the first web on a standard vacuum seal packaging machine. Vacuum was applied and the webs were sealed at 200° F. with a cycle time of 15 seconds. Formability and seal strength were good to excellent.

Example 18

A package is prepared from the Example 16 film using a process similar to that used in Example 15.

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A monolithic film obtained from a blend consisting essentially of:

(a) one or more aliphatic organic acids or salts thereof having fewer than 36 carbon atoms;

(b) at least one E/X/Y copolymer (ethylene acid copolymer) wherein E is derived from ethylene, X is derived from at least one $C_3$ to $C_8$ $\alpha,\beta$-ethylenically unsaturated carboxylic acid, and Y is derived from a comonomer selected from alkyl acrylates and alkyl methacrylates, wherein the alkyl groups have from 1 to 8 carbon atoms, or ionomers of said E/X/Y copolymers, wherein X is from about 3 to about 30 weight % of said E/X/Y copolymer, and Y is from 0 to about 35 weight % of said E/X/Y copolymer, and wherein greater than 70% of all the total acid moieties from (a) plus (b) are neutralized to the corresponding metal salts; and (c) at least one additional polymer selected from the group consisting of: silicone-containing polymers and ethylene copolymers having comonomer units selected from the group consisting of alkyl acrylates, alkyl methacrylates, carbon monoxide, vinyl acetate, maleic anhydride, maleic anhydride derivatives and mixtures thereof.

2. The film of claim 1 wherein the acid moieties of (a) and of (b) are greater than about 80% nominally neutralized.

3. The film of claim 2 wherein the metal salts consist essentially of calcium and/or magnesium cations.

4. The film of claim 3 wherein the metal salts consist essentially of calcium cations.

5. The film of claim 3 wherein the metal salts consist essentially of magnesium cations.

6. The film of claim 5 wherein the acid moieties of (a) and of (b) are greater than about 80% nominally neutralized.

7. The film of claim 6 wherein the acid moieties of (a) and of (b) are greater than about 90% nominally neutralized.

8. The film of claim 7 wherein the acid moieties of (a) and of (b) are from about 91 to about 100% nominally neutralized.

9. The film of claim 8 wherein the organic acid of part (a) is present in an amount of from about 5 to about 150 parts per hundred parts by weight of the unsaturated carboxylic acid copolymer or ionomer.

10. The film of claim 9 wherein the organic acid of part (a) is present in an amount of from about 25 to about 80 parts per hundred parts by weight of the unsaturated carboxylic acid copolymer or ionomer.

11. The film of claim 10 wherein X is present in the unsaturated carboxylic acid copolymer in an amount of from about 4 to about 25 weight percent of the polymer.

12. The film of claim 11 wherein X is present in an amount of from about 5 to about 20 weight percent of the polymer.

13. The film of claim 10 wherein Y is 0 weight percent of the polymer.

14. The film of claim 13 wherein Y is present in from 0.1 to 35 weight percent of the polymer.

15. The film of claim 14 wherein Y is present in from 5 to 30 weight percent of the polymer.

16. The film of claim 15 wherein Y is selected from monomers in the group consisting of alkyl (meth)acrylates having alkyl groups having from 1 to 6 carbon atoms.

17. The film of claim 16 wherein Y is selected from monomers in the group consisting of alkyl (meth)acrylates having alkyl groups having from 1 to 4 carbon atoms.

18. The film of claim 1 wherein the additional polymer is an ethylene copolymer having comonomer units selected from the group consisting of vinyl acetate, alkyl acrylates and alkyl methacrylates.

19. The film of claim 16 wherein the component (c) silicon-containing polymer is selected from the group consisting of ethylene vinyl silane copolymers; polysiloxane; and silicone rubber.

20. A multilayer film comprising at least one film layer obtained from a blend consisting essentially of:

(a) one or more aliphatic organic acids or salts thereof having fewer than 36 carbon atoms;

(b) at least one E/X/Y copolymer wherein E is derived from ethylene, X is derived from at least one $C_3$ to $C_8$ $\alpha,\beta$-ethylenically unsaturated carboxylic acid (ethylene acid copolymer), and Y is derived from a comonomer selected from alkyl acrylates and alkyl methacrylates, wherein the alkyl groups have from 1 to 8 carbon atoms, or ionomers of said E/X/Y copolymers, wherein X is from about 3 to about 30 weight % of said E/X/Y copolymer, and Y is from 0 to about 35 weight % of said E/X/Y copolymer, and wherein greater than 70% of all the total acid moieties from (a) plus (b) are neutralized to the corresponding metal salts; and (c) at least one additional polymer selected from the group consisting of: silicone-containing polymers and ethylene copolymers having comonomer units selected from the group consisting of alkyl acrylates, alkyl methacrylates, carbon monoxide, vinyl acetate, maleic anhydride, maleic anhydride derivatives and mixtures thereof.

21. The multilayer film of claim 20 comprising at least a second film layer comprising a blend of (a), (b), and (c) that is a different composition from the at least first film layer.

22. The multilayer film of claim 20 comprising at least a second layer wherein the second layer comprises a blend of:

(a) one or more aliphatic, organic acids having fewer than 36 carbon atoms, or salts thereof; and (b) one or more E/X/Y copolymers where E is derived from ethylene, X is derived from at least one $C_3$ to $C_8$ $\alpha,\beta$-ethylenically unsaturated carboxylic acid, and Y is derived from a softening comonomer selected from alkyl acrylate and alkyl methacrylate, wherein the alkyl groups have from 1 to 8 carbon atoms, or ionomers of said E/X/Y copolymers, wherein X is from about 3 to about 35 weight % of said E/X/Y copolymer, and Y is from 0 to about 35 weight % of said E/X/Y copolymer, and wherein greater than about 70% of all the acid moieties of (a) and of (b) are neutralized.

23. The multilayer film of claim 20 comprising at least one other polymeric layer (ii) consisting essentially of one or more ethylene-containing polymers.

24. The multilayer film of claim 23 wherein the one or more ethylene-containing polymers of (ii) is selected from the group consisting of polyethylene homopolymers and copolymers, including LDPE, LLDPE, ULDPE, VLDPE, mPE, ethylene propylene copolymers, ethylene/propylene/diene monomer (EPDM) copolymers; and ethylene copolymers derived from copolymerization of ethylene and at least one polar comonomer selected from the group consisting of (meth)acrylic acid, alkyl (meth)acrylate, vinyl acetate, maleic anhydride, maleic acid, maleic acid monoester, and CO, wherein copolymers comprising acid groups (e.g. (meth) acrylic acid) optionally are at least partially neutralized.

25. The multilayer film of claim 24 wherein (ii) comprises a graft copolymer.

26. The multilayer film of claim 24 wherein (ii) consists essentially of a copolymer of ethylene and vinyl acetate.

27. The multilayer film of claim 26 comprising at least three polymeric layers wherein the outer layers consist essentially of an ethylene/vinyl acetate copolymer.

28. The multilayer film of claim 24 comprising at least two layers, wherein at least one of the additional polymeric layers consist essentially of a copolymer of ethylene and an alkyl (meth)acrylate.

29. The multilayer film of claim 24 comprising at least three polymeric layers wherein the outer layers each consist essentially of a copolymer of ethylene and an alkyl (meth) acrylate.

30. The multilayer film of claim 23 wherein (ii) consists essentially of a metallocene polyethylene having a density of less than 0.91 g/cc; or a blend of a metallocene polyethylene having a density of less than 0.91 g/cc and a low density polyethylene.

31. The multilayer film of claim 30 comprising at least three polymeric layers wherein the outer layers consist essentially of a metallocene polyethylene having a density of less than 0.91 g/cc; or a blend of a metallocene polyethylene having a density of less than 0.91 g/cc and a low density polyethylene.

32. The multilayer film of claim 23 wherein (ii) consists essentially of an E/X/Y copolymer wherein E is derived from ethylene, X is derived from at least one $C_3$ to $C_8$ α,β-ethylenically unsaturated carboxylic acid, and Y is derived from a softening comonomer selected from alkyl acrylate and alkyl methacrylate, or ionomers of the E/X/Y copolymers, wherein X is from about 3 to 35 weight % of the E/X/Y copolymer, and Y is from 0 to about 35 weight % of the E/X/Y copolymer and wherein from about 0% to about 90% of the acid in X is neutralized.

33. The multilayer film of claim 32 comprising at least three polymeric layers wherein the outer layers consists essentially of the ionomer of (ii).

34. The multilayer film of claim 23 comprising at least three polymeric layers wherein at least one polymeric layer (ii) consists essentially of an E/X/Y copolymer where E is derived from ethylene, X is derived from at least one $C_3$ to $C_8$ α,β-ethylenically unsaturated carboxylic acid, and Y is derived from a softening comonomer selected from alkyl acrylate and alkyl methacrylate, or ionomers of the E/X/Y copolymers, wherein X is from about 3 to 35 weight % of the E/X/Y copolymer, and Y is from 0 to about 35 weight % of the E/X/Y copolymer and wherein from about 0% to about 90% of the acid is neutralized; and at least one additional polymeric layer (iii) consists essentially of a metallocene polyethylene having a density of less than 0.91 g/cc; or a blend of a metallocene polyethylene having a density of less than 0.91 g/cc and a low density polyethylene.

35. The multilayer film of claim 23 comprising at least three polymeric layers wherein one polymeric layer (ii) consists essentially of an E/X/Y copolymer where E is derived from ethylene, X is derived from at least one $C_3$ to $C_8$ α,β-ethylenically unsaturated carboxylic acid, and Y is derived from a softening comonomer selected from alkyl acrylate and alkyl methacrylate, or ionomers of the E/X/Y copolymers, wherein X is from about 3 to 35 weight % of the E/X/Y copolymer, and Y is from 0 to about 35 weight % of the E/X/Y copolymer and wherein from about 0% to about 90% of the carboxylic acid in X is neutralized; and at least one additional polymeric layer (iii) consisting essentially of a copolymer of ethylene and vinyl acetate or a copolymer of ethylene and an alkyl (meth) acrylate.

36. A package comprising a film of claim 1.

37. A package comprising a film of claim 20.

* * * * *